L. BAUMGARTL.
MACHINE FOR MANUFACTURING SLABS OR THE LIKE OF CEMENT OR LIKE MATERIAL.
APPLICATION FILED JULY 29, 1916.
1,367,227.
Patented Feb. 1, 1921.
7 SHEETS—SHEET 1.
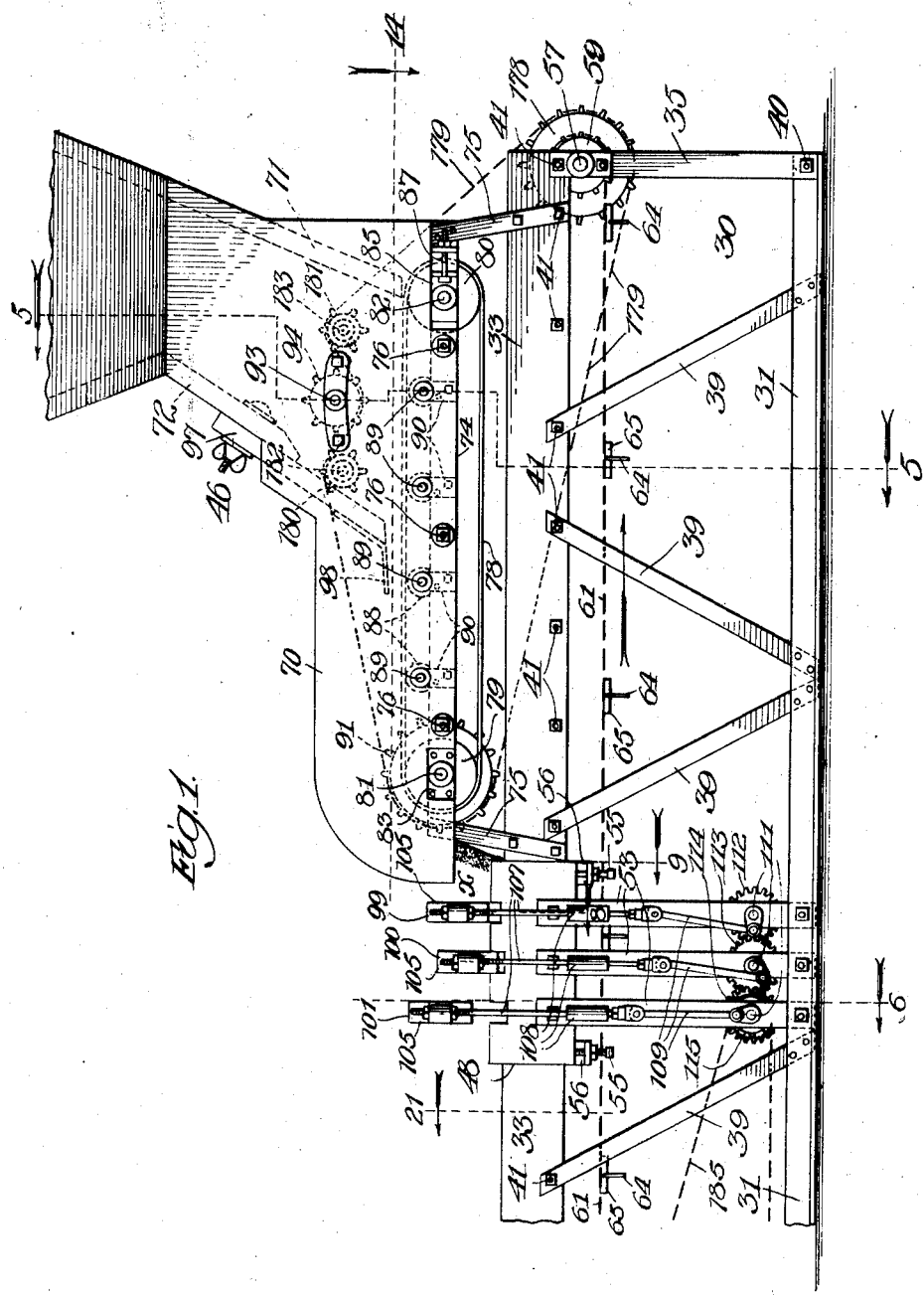

L. BAUMGARTL.
MACHINE FOR MANUFACTURING SLABS OR THE LIKE OF CEMENT OR LIKE MATERIAL.
APPLICATION FILED JULY 29, 1916.
1,367,227.
Patented Feb. 1, 1921.
7 SHEETS—SHEET 2.
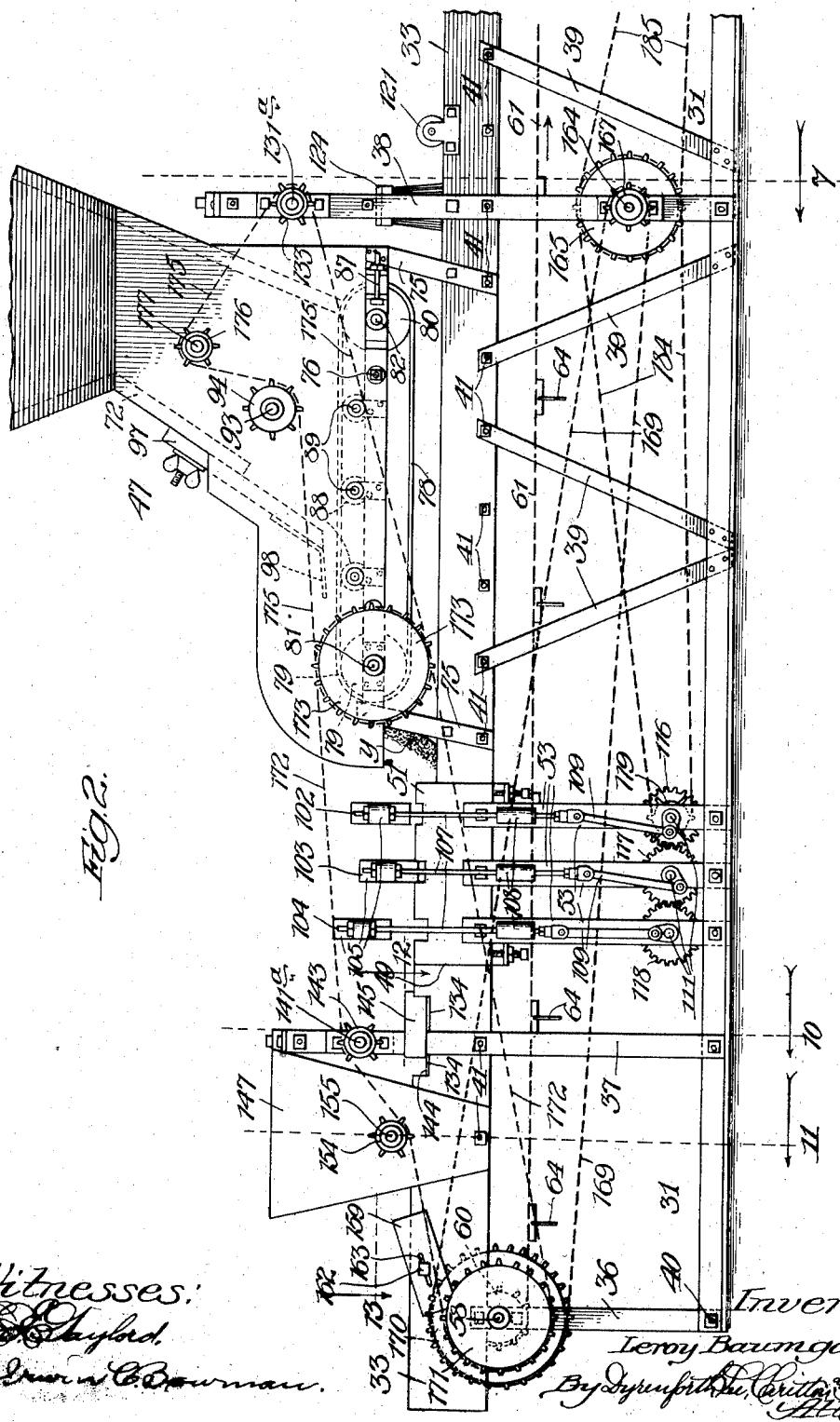

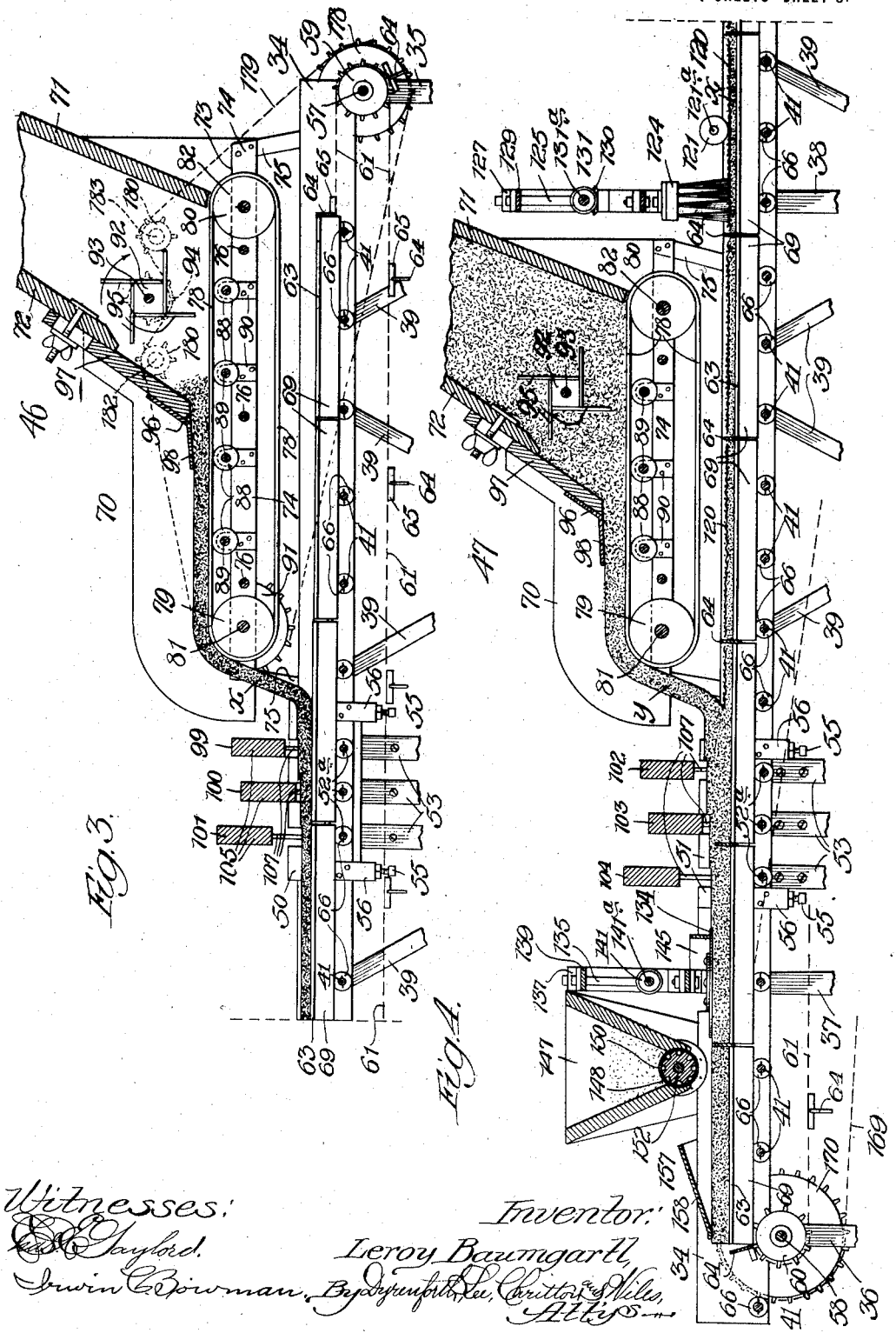

L. BAUMGARTL.
MACHINE FOR MANUFACTURING SLABS OR THE LIKE OF CEMENT OR LIKE MATERIAL.
APPLICATION FILED JULY 29, 1916.
1,367,227.
Patented Feb. 1, 1921.
7 SHEETS—SHEET 4.
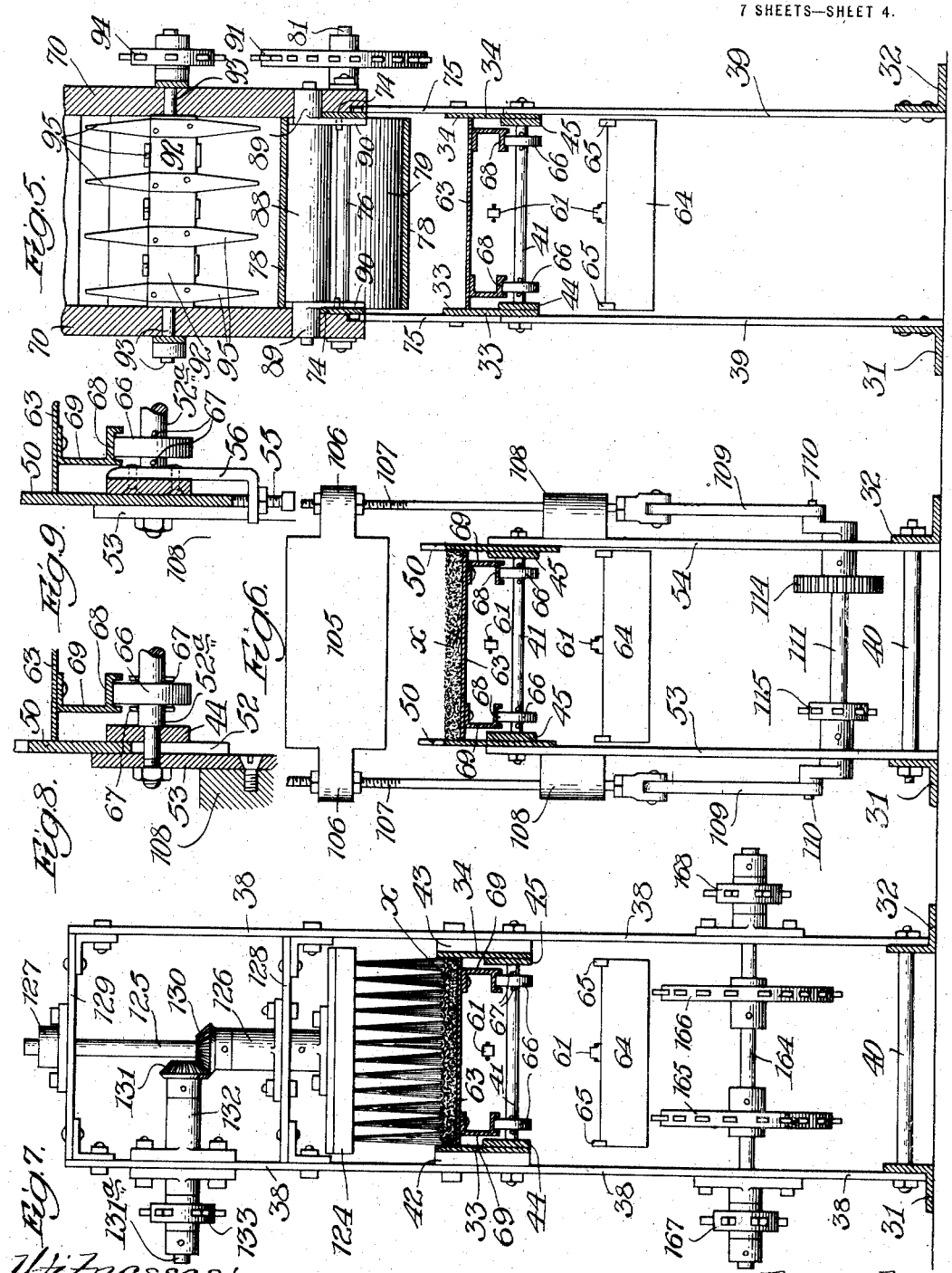

L. BAUMGARTL.
MACHINE FOR MANUFACTURING SLABS OR THE LIKE OF CEMENT OR LIKE MATERIAL.
APPLICATION FILED JULY 29, 1916.
1,367,227.
Patented Feb. 1, 1921.
7 SHEETS—SHEET 5.
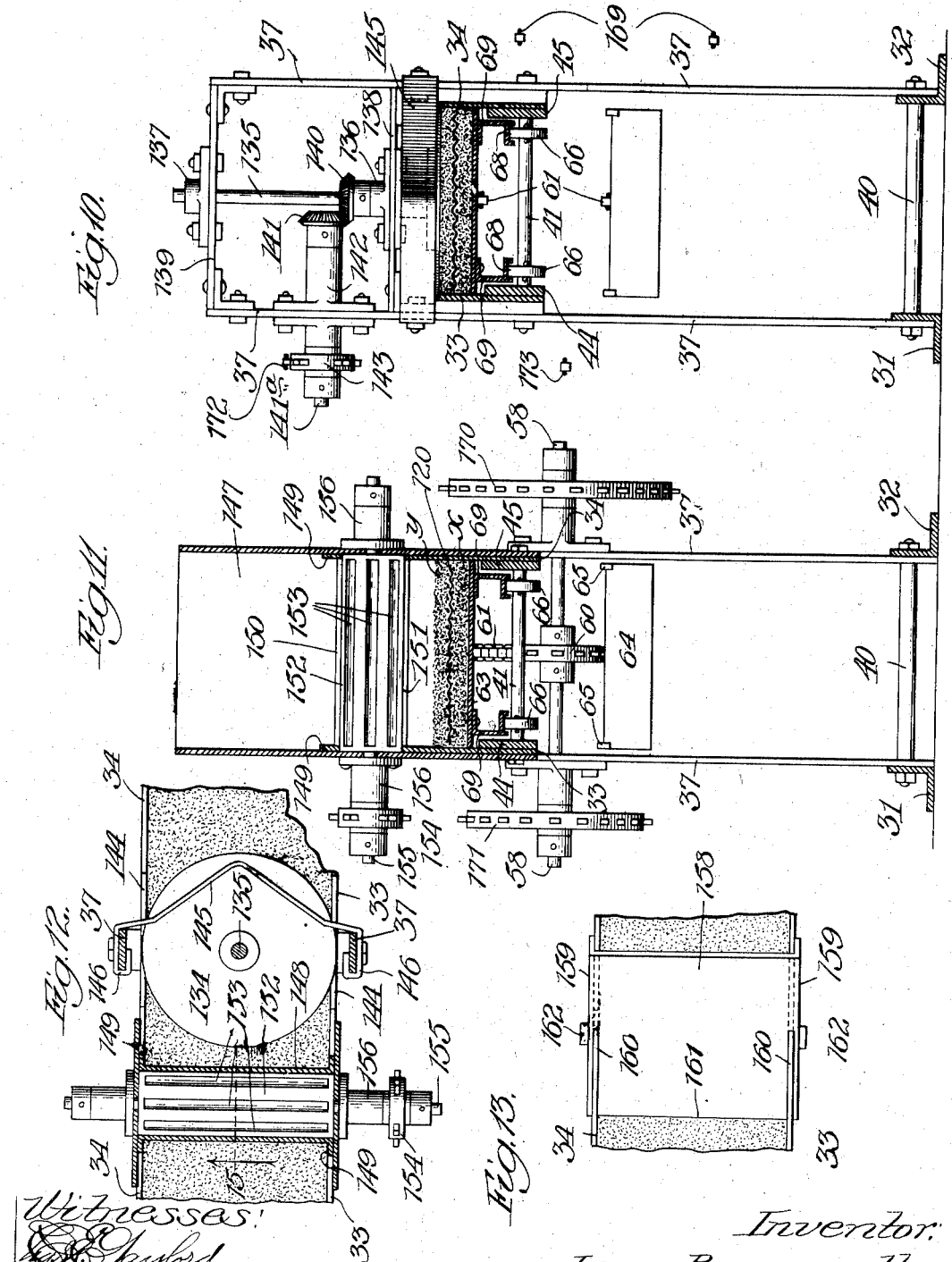

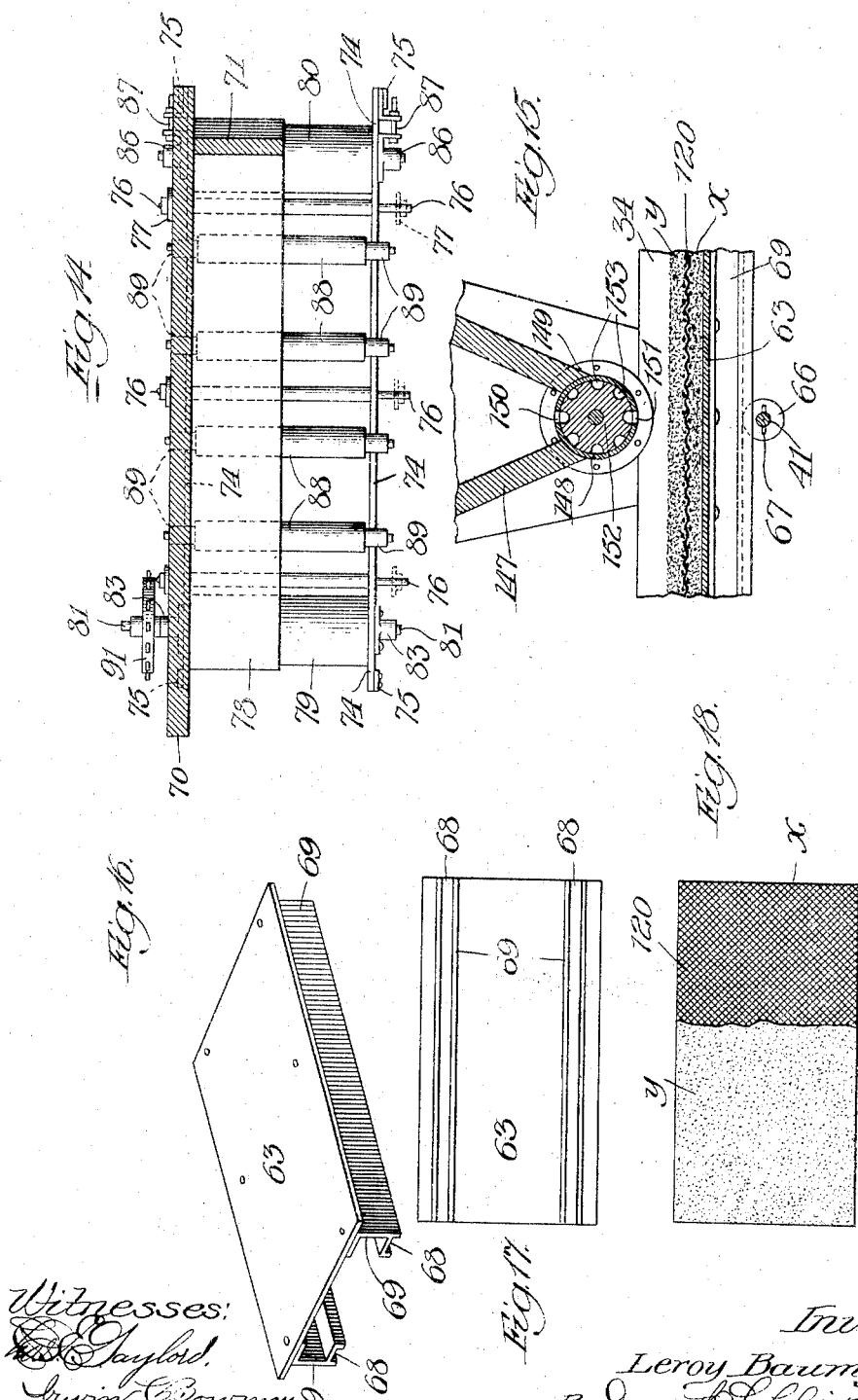

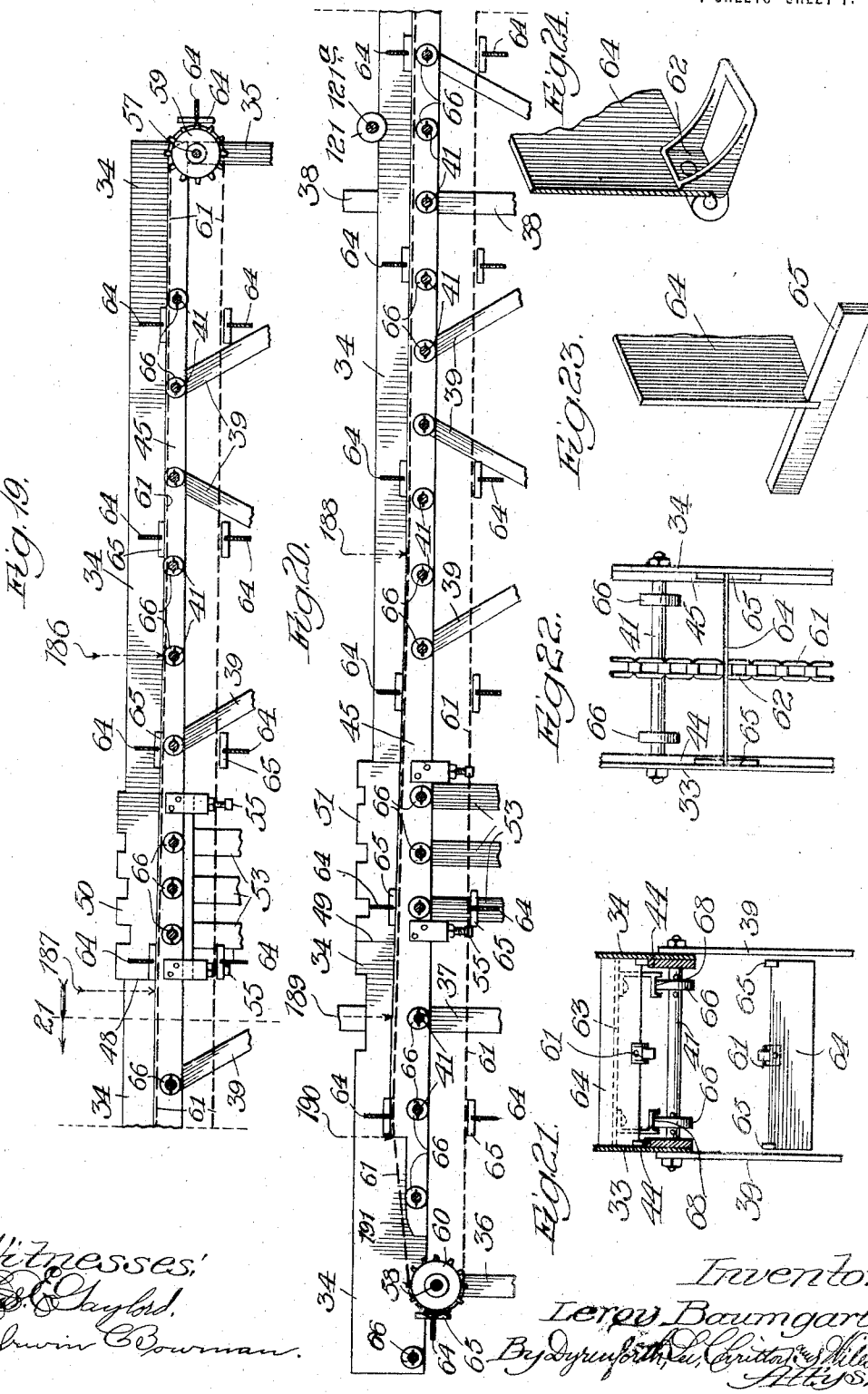

UNITED STATES PATENT OFFICE.

LEROY BAUMGARTL, OF CHICAGO, ILLINOIS.

MACHINE FOR MANUFACTURING SLABS OR THE LIKE OF CEMENT OR LIKE MATERIAL.

1,367,227. Specification of Letters Patent. Patented Feb. 1, 1921.

Application filed July 29, 1916. Serial No. 112,007.

*To all whom it may concern:*

Be it known that I, LEROY BAUMGARTL, a citizen of the United States, residing at Chicago, in the county of Cook and State of Illinois, have invented a new and useful Improvement in Machines for Manufacturing Slabs or the like of Cement or like Material, of which the following is a specification.

My invention relates more particularly to machines for manufacturing slabs or tile of the reinforced type used in building roofs or other structures, though as will be clearly understood, it is not limited to use in manufacturing these particular structures, nor is it limited to the manufacture of this particular type of slab or tile.

My primary object is to provide improvements in this art to the end that the operation of forming such structures of cement, or the like, may be rapidly, economically and satisfactorily performed, the machine for doing this work being economical of construction, positive in operation and requiring the minimum amount of labor in the operation of producing the slabs or tile. Another object is to provide for the production of an article by mechanical means which will possess the desired denseness and finish.

Referring to the accompanying drawings, Figure 1 is a view in side elevation of the front end portion of a machine constituting a desirable embodiment of my invention, and Fig. 2 a similar view of the rear end of the machine, these two views being a continuation of each other. Fig. 3 is a view in longitudinal sectional elevation of the structure shown in Fig. 1 taken immediately inside of one of the side bars, this view showing the machine in operation in which condition the cement, or the like, is discharged from the hopper therein shown, upon the juxtaposed pallets whereon it is operated on by the tamping mechanism. Fig. 4 is a view like Fig. 3, of that part of the machine shown in Fig. 2, this view illustrating the operation of the machine wherein, after applying the reinforcing material, the upper surface of the cement is roughened and thereafter a second layer of cement is applied to the previously-formed layer of cement and tamped into position, the upper surface of the tamped mass being then smothed off and a finishing material applied to the mass. Fig. 5 is an enlarged section taken at the broken line 5 on Fig. 1 and viewed in the direction of the arrow. Fig. 6 is an enlarged section taken at the line 6 on Fig. 1 and viewed in the direction of the arrow, this view being taken adjacent one of the tamping devices. Fig. 7 is a section taken at the line 7 on Fig. 2 and viewed in the direction of the arrow, this view being taken adjacent the brush device for roughening the upper surface of the first layer of cement. Fig. 8 is an enlarged broken section taken at the line 8 on Fig. 1 and viewed in the direction of the arrow. Fig. 9 is a similar section taken at the line 9 on Fig. 1 and viewed in the direction of the arrow. Fig. 10 is an enlarged section taken at the line 10 on Fig. 2 and viewed in the direction of the arrow, this view being taken adjacent the surfacing disk which coöperates with the slabs and produces a smoothing of the surface of the latter. Fig. 11 is a section taken at the line 11 on Fig. 2 and viewed in the direction of the arrow, this section being taken through the part of the apparatus by means of which surfacing material, such as a rich fluid-mixture of cement and fine sand, colored if desired, for causing the slab to present the desired finish, is applied to the slabs. Fig. 12 is an enlarged section taken at the line 12 on Figs. 2 and 4 and viewed in the direction of the arrow. Fig. 13 is a broken plan view of the device which serves by trowel action to finish the upper surfaces of the slabs. Fig. 14 is an enlarged broken section partly diagrammatic, taken at the line 14 on Fig. 1 and viewed in the direction of the arrow, one half only of the conveyer-belt forming the bottom of this hopper being shown. Fig. 15 is a broken enlarged view of the device of Fig. 11 for applying the surfacing material, showing it in section, as represented in Fig. 4, with the cement slab directly under it in position to receive the material. Fig. 16 is a perspective view of one of the plurality of pallets upon which the slabs are formed in the operation of the machine. Fig. 17 is a bottom plan view of the pallet of Fig. 16. Fig. 18 is a plan view of the slab formed by the particular construction of machine illustrated, a part of one layer of the slab being broken away to disclose the reinforcement embedded in the slab between the two layers of cement. Fig. 19 is a view in side elevation, and in the nature of a diagram, of the right-hand end of the machine, this view corresponding with Fig. 1 and being taken immediately inside of one of the side-bars, with certain parts removed to bring out the detail of certain track-bars employed. Fig. 20 is a view like Fig. 19 of the other end of the machine, these views being continuations of each other. Fig. 21 is a section taken at the line 21 on Figs. 1 and 19 and viewed in the direction of the arrows. Fig. 22 is a broken plan view of the conveyer-chain, division-plates carried thereby and the tracks for the latter. Fig. 23 is a broken perspective view of the end of one of the similar division-plates; and Fig. 24, a broken perspective view of a division-plate showing the means of attachment to the conveyer-chain.

The machine illustrated in the drawings and constituting a desirable embodiment of my invention, and providing for the formation of flat slabs of cement, or the like, with reinforcement embedded therein, is formed of a supporting framework 30, preferably formed of longitudinally-extending angle irons 31 and 32 spaced apart transversely of the machine; longitudinally-extending bars 33 and 34 spaced apart and arranged above the angle irons 31 and 32; upright bars 35 and 36 at opposite ends of the frame at the corners thereof which connect the said angle bars and the bars 33 and 34 together; other upright bars 37 and 38 arranged at opposite sides of the frame and connecting the bars 31, 32, 33 and 34 together; and struts 39 connected with these bars and serving to increase the rigidity of the frame. The uprights 36, 37, 38 and 39 are connected with the angles 31 and 32 by means of spacer-bolts 40, and the bars 33 and 34 are connected with these uprights and with the struts 39 through the medium of spacer-bolts 41 which extend at their reduced ends through these uprights, blocks 42 and 43, the bars 33 and 34, and bars 44 and 45 which extend at their upper edges a distance slightly below the center line of the bars 33 and 34, and form tracks upon which the division-plates hereinafter referred to, move.

In the construction of the machine illustrated two hoppers or feed devices, for feeding the cement or other material used and from which the slabs are to be made, are employed, one of these hoppers supplying to the pallet devices hereinafter described, and which are driven through the machine in continuous succession, the cement for forming the lower layer of the slab, and the other of the hoppers supplying to the layer of cement first discharged upon the pallets, a second layer of cement, preferably upon a sheet of reinforcement applied to the upper surface of the first layer, these two hoppers or feed devices being represented generally at 46 and 47. The bars 33 and 34 are provided in sections, and are spaced apart lengthwise of the machine at two places, as indicated at 48 and 49 immediately in advance of the discharge ends of the hoppers, 46 and 47, respectively, at which locations it is desired that the cement discharged by the feed devices be tamped into compact condition, and accordingly provision is made for effecting this operation, as hereinafter explained. The spaces 48 and 49 at opposite sides of the machine are fitted with vertically adjustable sections 50 and 51, these sections being in the form of plates which are mounted to extend in alinement with the plates 33 and 34. The plates 50 and 51 are adjustably supported in the same way, and therefore a description of one set of plates will suffice. The plates 50 contain vertical slots 52 through which the reduced ends of spacer-holes 52$^a$ extend, these reduced ends also extending through the bars 44 and 45 at opposite sides of the machine and the upper ends of uprights 53 and 54, the latter secured at their lower ends to the angles 31 and 32. The lower edges of the plates 50 coöperate with vertically-disposed set-screws 55 which screw into the horizontal portions of depending brackets 56 secured to the inner surfaces of the bars 44 and 45 as more particularly shown in Fig. 9.

In the particular embodiment of the invention illustrated, the bars 33 and 34 and 50 and 51, which are in alinement lengthwise of the machine as stated, form means which confine the cement, or the like material, against lateral spreading during the operation of tamping the cement delivered from the hoppers referred to to the pallets, which latter are moved through the machine in end to end relation by the conveyer devices, of which the following is a description.

Journaled in the upper ends of the uprights 35 and 36 are shafts 57 and 58, respectively, these shafts carrying sprockets 59 and 60, respectively, located midway between the ends of these shafts, as represented of the sprocket 60 in Fig. 11. These sprockets are connected together by an endless conveyer-chain 61 which is provided at intervals of equal distance with outwardly-extending lugs 62 which are spaced apart preferably a distance equal to the length of the pallets employed and represented at 63, and are connected with division-plates 64 which extend transversely of the conveyer and are equipped with shoes 65 which ride upon the tracks 44 and 45, as hereinafter described, these plates being so arranged on the conveyer-chain that they engage the ends of the pallets and move them through the machine in relatively close order. The spacers 41 and 52$^a$ form journal supports for rollers 66 held against lateral movement thereon by pins 67, these rollers being arranged at opposite sides of the center line of the machine and in proper position to enter the channels 68 provided in bars 69 secured to, and depending from, the undersides of the pallets 63, these bars extending lengthwise of the pallets and in parallel relation to each other and to the lateral edges of the pallets.

It may be here stated that in the operation of the machine the pallets in succession are introduced into that portion of the machine which is bounded by the plates 33 and 34, to rest at their channeled portions 68 upon the rollers 66, the pallets being pushed forwardly by hand until they are in a position to be engaged by the plates 64 on the conveyer which by engaging with the rear ends of the pallets drives the latter to the left in Figs. 1, 2, 3 and 4.

Referring to the hopper 46, this structure as shown is formed of side-members 70 spaced apart, extending lengthwise of the machine and connected with transversely-disposed members 71 and 72 which, with the side-members 70, form a hopper or conduit through which the cement, or other material from which the slabs are to be made, is conducted to the pallets. The inner surfaces of the side-members 70 are recessed as indicated at 73, in which bars 74 are located. These bars, which are connected with the upper ends of legs 75 which are secured to the bars 33 and 34 and by which the structure being described is supported, are rigidly held in position in the side-members 70 and brace the parts of this structure, by spacer-bolts 76 which extend at their reduced ends through openings in the bars 74 and sides 70, the shouldered enlarged portions of these spacer-bolts 76 fitting against the inner surfaces of the bars 74 and the nuts 77 for these bolts bearing against the outer faces of the side-members 70. The hopper 46 is provided with means for forcing the cement, or other material with which it is charged, into position for discharge upon the pallets as they are moved in succession through the machine through the medium of the endless conveyer 61. This mechanism in the construction shown comprises an endless belt 78 supported on rollers 79 and 80 fixed on shafts 81 and 82, respectively. The shaft 81 is journaled at its opposite ends in bearings 83 rigidly secured to the bars 74 and extending into recesses 84 in the lower edges of the side-members 70, and the shaft 82 extends through recesses 85 in the side members 70, through slots (not shown) in the bars 74 and is journaled in bearings 86 adjustable longitudinally of the belt 78 by means of a belt tightener represented at 87, the upper portion of the belt running over rollers 88 journaled at their reduced ends in bearings 89 provided on the upper ends of straps 90 secured to the inner surfaces of the bars 74. The shaft 81 carries a sprocket 91 driven, as hereinafter described, for actuating the conveyer. The hopper 46 contains, by preference, means for agitating the cement in the hopper and aiding in the discharge of the cement from this part of the apparatus for delivery to the pallets. The agitator in the form illustrated, comprises a body-portion 92 of rectangular shape in cross-section rigidly mounted on a shaft 93 journaled in the sides 70 of the hopper and equipped with a sprocket 94, driven as hereinafter described, and blades 95 secured to the body-portion 92, it being preferred that these blades be provided of the form, and arranged, as shown, namely, to extend outwardly from the body-portion 92 in the planes of its sides, with those sets of blades which are disposed at right angles to each other, arranged in staggered relation (Fig. 5). In the operation of the machine the cement discharged from the hopper in ribbon form and in order that this ribbon shall be of uniform thickness a gage device, represented at 96 is provided. This gage device comprises a board 97 which extends crosswise of the hopper device and forms a continuation of the hopper section 72 which it overlaps and on which it is adjustable up and down to adjust the rearwardly-extending plate-section 98 of this device, vertically with respect to the conveyer-belt 78, the height at which this part 98 extends gaging the thickness of the ribbon of cement discharged from the hopper.

The hopper 47 is of the same construction, and is formed of the same parts, as explained of the hopper 46, and is the same as this last referred to hopper, except that the conveyer-belt is shown slightly shorter than the belt of the hopper 46; two of the spacer-bolts 76 are employed instead of three, and three of the belt-supporting rollers 88 are provided instead of four. Accordingly the same numerals have been applied to those parts of the hopper mechanism 47 as are applied to similar parts of the hopper mechanism 46.

As hereinbefore stated, the cement, after being discharged, as to the first layer, represented at X, directly upon the pallets, and, as to the second layer, represented at Y, upon the reinforcement applied to the top of the first layer, is tamped to cause the slab when completed to be of the desired density. In carrying out this purpose a set of tampers is provided adjacent the discharge end of each of the hopper mechanisms 46 and 47 and adjacent the bar-sections 50 and 51. These tampers are preferably so provided that the compressing of the cement to the final density required is effected by a series of steps; or, in other words, it is first tamped to a certain height by one tamper, then to a slightly less height by the next tamper, and so on, until the last tamper tamps the material to the desired level. In the arrangement shown the tamping of each layer is effected by three tampers, those for the first layer being represented at 99, 100 and 101, and the tampers for the second, or superposed, layer of cement being represented at 102, 103 and 104. The tampers shown each comprise a tamper proper 105 mounted at lateral extensions 106 thereon on the upper ends of slide-rods 107 slidingly confined to be reciprocated vertically, in guides 108 secured to the upright bars 53 and 54, the rods 107 having pitman connection at 109 with crank-pins 110 provided on the opposite ends of a shaft 111 journaled in the adjacent upright bars 53 and 54; whereby upon rotating the shafts 111 the tamper devices 105 will be reciprocated up and down. In the particular arrangement shown, the shafts 111, for actuating the tamping devices 99, 100 and 101, are connected together, through the medium of gears 112, 113 and 114 rigidly secured to these three shafts, the shaft 111 carrying the gear 114, being provided with a sprocket 115 through the medium of which these three tampers are driven, as hereinafter described. The three shafts 111, through the medium of which the tampers 102, 103 and 104 are operated, are provided with gears 116, 117 and 118 meshing with each other, the shaft 111 on which the gear 116 is carried being provided with a sprocket 119 by means of which these three shafts are operated, as hereinafter described.

Referring particularly to the tampers 99, 100 and 101, the tampers proper 105 of these devices are mounted on the rods 107 at such a distance above the respective shafts 111 for operating them, that the tamper 99, which is the first to act upon the material as it is advanced through the machine on the pallets, will tamp the cement to a certain level, the tamper 100 will tamp it to a lower level and the tamper 101 will tamp it to the final level to render the material of the desired density, and the arrangement of the tampers 112, 113 and 114 is such that a graduated tamping of the second layer of cement, beginning with the tamper 112 and ending with the tamper 114, is produced, as explained of the other tampers.

In the operation of the machine described for producing slabs or tiles containing reinforcing members which may be of any suitable construction and which according to the illustration in Fig. 18 and represented at 120 is a suitable wire mesh, but which may be rods, or both, the sheets or pieces of reinforcement are applied to the upper surface of the first layer of cement, namely, that applied by the hopper device 46, by an operator located intermediate the series of tampers 99, 100 and 101 and a roller device 121 mounted on the shaft 121$^a$ journaled in the side members of the frame of the machine, operates to force the reinforcement into embedded condition in the said first layer of cement, as the pallets with the cement compacted thereon are moved under this roller. A slight distance in the rear of the roller 121 is a mechanism represented generally at 122 for engaging the cement exposed through the meshes of the reinforcing members 120, to coat the metal thoroughly for proper protection and roughen the cement layer to prepare it for desirable bonding with the second layer of cement applied through the medium of the hopper device 47, these means, as shown, comprising a brush device 124, the depending bristles of which are so positioned that they bear against the surfaces of the cement to be roughened, this brush being journaled to rotate in a horizontal plane, at a stem 125 thereon journaled in bearings 126 and 127 mounted on cross-pieces 128 and 129, respectively, secured rigidly to the uprights 38, the shaft 125 carrying a miter-gear 130 which meshes with another miter-gear 131 on a shaft 131$^a$ journaled in a bearing 132 mounted in one of the uprights 38 and carrying a sprocket-wheel 133 through the medium of which the brush is continuously rotated as hereinafter described.

Located a slight distance beyond the tampers 102, 103 and 104 is a mechanism for gaging the thickness of slabs to be produced, to insure the production of slabs of uniform and desired thickness. These means, in accordance with the preferred embodiment of my invention, comprise a smoothing disk 134 mounted to extend in a horizontal plane, on the lower end of a vertically-disposed shaft 135 journaled in bearings 136 and 137 mounted on cross-pieces 138 and 139 secured to the uprights 37, the shaft 135 carrying a miter-gear 140 which meshes with another miter-gear 141 on a shaft 141$^a$ journaled in a bearing 142 in one of the uprights 37 and carrying a sprocket 143 through the medium of which the disk 134 is continuously rotated, as hereinafter described. The disk 134 is so positioned that the lower surface thereof extends into the plane in which it is desired that the upper surface of the slabs or tile, in finished condition extend, this disk which extends into recesses 144 operating, when rotated, to shear off the upper surface of the slabs or tile to the desired thickness, it being preferred that a deflector 145 secured at its ends 146 to the uprights 37 and positioned immediately above the disk 134, be provided for deflecting toward opposite sides of the machine, to discharge through the recesses 144, the cement displaced by the disk 134.

In the rear of the surfacing mechanism just described I prefer to provide means for applying to the upper surfaces of the slabs or tile a surfacing material, such as that hereinbefore described, for producing the desired finish on the slabs or tile, and filling up any voids in the upper surfaces of the slabs. The mechanism illustrated for this purpose comprises a hopper 147 supported at its side walls on the adjacent spacer-bolts 41, as represented in Fig. 11, the bottom of this hopper being provided with a device for producing a constant feed of the material to the upper surfaces of the slabs which comprises a cylindrical shell 148 secured to the hopper at flanges 149 at opposite ends thereof, to extend across the discharge openings in the bottom of the hopper, this shell containing diametrically-opposing openings 150 and 151 disposed in a vertical plane; and a rotatable cylindrical member 152 located in said shell and provided about its periphery with a series of grooves 153 extending longitudinally thereof and adapted when the member 152 is rotated to feed the material to the top of the slabs by receiving it through the opening 150 and discharging it through the opening 151. The member 152 is rotated through the medium of a sprocket 154 fixed on one of the reduced ends 155 of the rotary device 152 journaled in bearings 156 secured to the sides of the hopper. In order that the surfacing material applied to the slabs from the hopper 147 be uniformly distributed over the upper surfaces thereof, I provide a trowel-device illustrated at 157 which is formed of a top plate 158 and side plates 159, the latter being spaced apart a sufficient distance to permit this device to be applied to straddling position over the side members 33 and 34, the plate 158 being slotted, as indicated at 160, in order that the forward edge 161 of this trowel-device may extend downwardly into the space between the side members 33 and 34 to engage the surfacing material applied by the hopper 147, this trowel-device being supported on the said side members through the medium of a bolt 162, which extends through these bars and through elongated slots 163 in the side members 159, permitting adjustment of the trowel to vary the height at which the edge 161 thereof extends.

The various driving connections for the several parts are as follows: The power is applied to the machine through the shaft 164 journaled in bearings in the uprights 38 and equipped with sprockets 165, 166, 167 and 168, the shaft being driven through the sprocket 167 from any suitable source of power. The sprocket 168 is connected by means of a sprocket-chain 169 with a sprocket 170 on the shaft 58 which carries the conveyer-supporting and operating-sprocket 60. The shaft 58 also carries a sprocket 171 which connects by means of a chain 172 with a sprocket 173 fixed on the shaft 81, this chain extending over, and in driving engagement with, the sprocket 143 and under, and in driving engagement with, the sprocket 154, whereby the conveyer-belt 78 of the hopper-device 47, the surfacing device 134 and the mechanism for applying the finishing material, are operated from the shaft 58. The shaft 81 also carries a sprocket 174 which engages a sprocket-chain 175 which passes partially around, and engages, the sprocket 133, extends over an idler 176 mounted on a shaft 177 journaled in the sides of the hopper-device 47 and under, and in engagement with, the sprocket 94 of the second hopper-device through the medium of which the agitator therein is actuated. The shaft 57, which is driven from the shaft 58, as hereinbefore explained, is provided with a sprocket 178 which engages a sprocket-chain 179 which extends over idler-sprockets 180 and 181 on shafts 182 and 183 journaled in the sides of the hopper 46 and under, and in engagement with, the sprocket 94 which operates the agitator in the hopper of Fig. 1. The sprocket 165 on the power-shaft 164 engages a sprocket-chain 184 which extends into engagement with the sprocket 119 for driving the set of tampers 102, 103 and 104; and the sprocket 166 on this power-shaft is connected by a sprocket-chain 185 with the sprocket 115 for actuating the tampers 99, 100 and 101.

The plates 64 carried by the conveyer-chain 61, in the particular construction illustrated, not only serve as the means whereby the pallets are advanced through the machine, but also serve to cause the mass of cement on each pallet to be separated from the masses of cement on adjacent pallets in order that the cement shall be formed in slabs or tile and permit of the separate removal from the machine, of each pallet with the slab or tile superposed thereon. As a desirable way of performing this result I prefer to provide for the rise of these division-plates in the spaces between adjacent pallets during the movement of the pallets through the machine, but without interfering with the operation of the tampers, and this is preferably done by so forming the tracks 44 and 45 that these plates in moving along the tracks will be given the proper vertical movement. This feature of construction is best illustrated in Figs. 19 and 20, these views being a continuation of each other wherein the tops of the tracks 44 and 45 from the right-hand end of the machine to the line indicated at 186 are substantially horizontal and extend in such a vertical plane that the upper edges of the division-plates 64, which preferably are relatively sharp, extend considerably below the lowest point to which the bottom surface of the tamper-head 105 of the tamper 99, moves in the operation of this tamper. From the line 186 to the line 187 the tracks 44 and 45 incline upwardly, preferably to such a vertical height as will cause the top edges of the division-plates to just clear the end surface of the head 105 of the tamper 101 when the latter is in its lowermost position and will cut its way through the cement and become exposed to view at the line 187. From the line 187 to the line 188 the upper surfaces of these tracks are substantially horizontal, and from line 188 to line 189 they again incline upwardly at such an angle that the upper edges of the division-plates 64 will just clear the lower edge of the tamper-head 105 of the tamper 104 when the latter is in lowermost position, and when the division-plates reach the line 189, they will extend substantially flush with the lower surface of the finishing-disk 139, the center line of which is substantially co-incident with the line 189. From the line 189 to the line 190 the said tracks are substantially horizontal, but beyond the line 190 these tracks are so cut away that the conveyer-chain 61 inclines downwardly to the sprocket 60 at a relatively sharp angle, as represented at 191, in Fig. 20, this angle being sufficiently great to insure sufficient downward movement of the division-plates in moving from the line 190 to the center of the said sprocket, to withdraw them from between the pallets, and break the bond between these plates and the cement. It will be understood from the foregoing that by this arrangement the cement, or other material delivered to the pallets, while in ribbon form, is automatically operated on to render the slabs or tile on adjacent pallets, in separated condition.

A general description of the operation of the construction is as follows: Assuming that power is applied to the shaft 164, the conveyer-chain 61 is caused to travel in the direction of the arrows in Figs. 1 and 2, the agitators and conveyers in the hoppers 46 and 47 are operated in a direction for discharging cement, or the like, of any desirable constituency, as, for example, that commonly used in the manufacture of cement slabs or tile, fed into the hoppers in any suitable manner, but preferably continuously from a cement-mixing-machine; the tampers are reciprocated up and down; the brush device 124 and the finishing-disk 134 are caused to rotate, and the feeding device for the surfacing material to be applied to the slab, is actuated; the operator applies to the rollers 66 at the right-hand end of the machine in Fig. 1, the empty pallets, a pallet being introduced into each space between adjacent ones of the division-plates 64 which are carried by the chain 61 in an endless path. When the pallets reach a position in their movement to the left in Figs. 1 to 4, inclusive, in which they are directly below the discharge end of the conveyer belt 78 of the hopper 46, they receive the cement, or the like, discharged in ribbon form from the first hopper device 46 (Figs. 1 and 3) at a speed equal to the speed of movement of the conveyer-chain 61. As the pallets carrying the cement material applied to them pass under the tampers 99, 100 and 101 the cement layer thereon is compacted to progressively greater density, the greater density being produced by the tamper 101, the division-plates 64 gradually work up through this layer of cement as it is being tamped and finally at the line 187 forcing their way through the upper surface of the layer to become exposed. Between this point and the roller 121 the operator applies the sheets 120 of reinforcing material to the upper surfaces of the layer between adjacent division-plates 64, these division-plates serving to apprise the operator of the location of the ends of the slabs or tile to be formed. As the conveyer 61 continues to move, it carries the pallets and their load under the roll 121 which presses the reinforcement into the cement, as hereinbefore described. The upper surface of the cement is then acted upon by the rotating brush device 124 which coats the reinforcement and roughens the cement, preparing it for desirable bond with the second layer of cement which is applied in superposed position on the first layer thereof from the hopper device 47 wherein the conveyer 78 coöperating with this hopper device and the agitator therein operates to discharge the cement at substantially the same rate of speed as that at which the conveyer 61 travels. The ribbon of cement thus discharged as the second layer upon the first layer of cement with the reinforcement thereon, moves successively under the tampers 102, 103 and 104, wherein it is tamped progressively to varying degrees of density, the last tamper to operate, namely, 104, tamping it to the greatest density. The division-plates 64 in this operation gradually force their way upward through the cement and when they reach a position immediately below the center of the finishing-disk 134 they extend at their upper surfaces substantially flush with the under surface of the latter, so that this finishing disk in shearing off the upper surface of the cement to produce the slabs or tile of desired thickness, shears it off substantially flush with the upper surfaces of the plates 64 and thus a sharp and clean separation of the cement mass on adjacent pallets, is produced, the deflector 145 in this operation disposing of the surplus cement displaced by the finishing-disk 134. In the continued movement of the conveyer 61, the slabs or tile pass under the device for applying the finishing material and shown partly in Fig. 15 where the finishing material is applied, and then pass under the trowel 157 which compresses the finishing coat and binds it to the body of the slabs or tile. In the movement of the pallets to the left in Fig. 20 from the line 190, the division-plates 64 by reason of the downward inclination of the conveyer-chain 61, as indicated at 191, are caused to move downward through the spaces between adjacent ends of the pallets, thus breaking the bond between them and the cement. The pallets with the formed slabs or tile thereon are removed from the machine by hand, or disposed of in any other suitable manner.

By locating the tampers of each set thereof closely adjacent to each other, and so arranging them in connection with their operating mechanism that they tamp to successively different elevations, the material acted on by each tamper in advance of its coöperating tampers, serves to crowd in a rearward direction, portions of the cement mixture into a position in which it is again subjected to the action of a tamper which previously acted upon it, and thus the tamping of the material in its movement through the machine is augmented with the obvious advantage.

Furthermore, it is preferred that the sides of the channel through which the cement material is moved, be stationary, as explained in the preceding description, inasmuch as the cement material in moving along these sides, and in contact therewith, the latter by reason of the tamping of the material in the channel, becomes relatively more condensed along its opposite edges, which is obviously an advantage.

While I have illustrated and described a particular embodiment of my invention, I do not wish to be understood as intending to limit it thereto, as my invention may be carried out by variously modifying and altering the construction shown.

What I claim as new and desire to secure by Letters Patent is—

1. In a machine of the character set forth, the combination of means for advancing a series of pallets, means for feeding a ribbon of cement, or the like, upon said pallets, means for compacting the cement on the pallets, and upwardly cutting means for severing the material where the compacting is being effected.

2. In a machine of the character set forth, the combination of means for advancing a series of pallets, means for producing a ribbon of cement, or the like, and feeding it to said pallets at substantially the same rate of speed as that at which said pallets are advancing, means for compacting the cement on the pallets, and upwardly cutting means for severing the material where the compacting is being effected.

3. In a machine of the character set forth, the combination of means for advancing a series of pallets, a receptacle for cement, or the like, means for feeding the cement in ribbon form from said receptacle upon the said pallets, means for compacting the cement on the pallets, and upwardly cutting means for severing the material where the compacting is being effected.

4. In a machine of the character set forth, the combination of means for advancing a series of pallets, a receptacle for cement, or the like, a conveyer at the bottom of said receptacle and operating to feed the material therefrom upon the pallets, means for causing the cement to discharge from the receptacle in ribbon form, and means for compacting the cement on the pallets.

5. In a machine of the character set forth, the combination of means for advancing a series of pallets, a receptacle for cement, or the like, means for causing the cement to feed in ribbon form onto the pallets at substantially the speed at which said first-named means operate, means for compacting the cement on the pallets, and upwardly cutting means for severing the material where the compacting is being effected.

6. In a machine of the character set forth, the combination of means for advancing a series of pallets, a receptacle for cement, or the like, a conveyer at the bottom of said receptacle and operating to feed the material therefrom upon the pallets, means for causing the cement to discharge from the receptacle in ribbon form, means for driving said first-named means and said conveyer at the same speed, and means for compacting the cement on the pallets.

7. In a machine of the character set forth, the combination of means for advancing a series of pallets, means for applying in a continuous stream cement, or the like, to said pallets, means for compacting the cement on said pallets, and upwardly cutting means for causing the cement on each pallet to be separated from the cement on the adjacent pallets where the compacting is being effected.

8. In a machine of the character set forth, the combination of means for advancing a series of pallets, means for applying in a continuous stream cement, or the like, to said pallets, means for compacting the cement on said pallets, and means on the machine for severing the mass of cement on said pallets along lines coincident with the adjacent opposed edges of said pallets and where the compacting is being effected.

9. In a machine of the character set forth, the combination of means for advancing a series of pallets, means for applying in a continuous stream cement, or the like, to said pallets, means for compacting the cement on said pallets, and automatically operating means for causing the cement on each pallet to be separated from the cement on the adjacent pallets, and where the compacting is being effected.

10. In a machine of the character set forth, the combination of means for advancing a series of pallets, means for applying in a continuous stream, cement, or the like, to said pallets, means for compacting the cement on said pallets, means operated by said first-named means for causing the cement on each pallet to be separated from the cement on the adjacent pallet and where the compacting is being effected.

11. In a machine of the character set forth, the combination of pallet-feeding means, means for applying cement, or the like, to said pallets, means for compacting the cement on said pallets, said pallet-feeding means being in the form of division plates which engage the ends of said pallets, means coöperating with said division plates for moving the latter upwardly while in engagement with the pallets for effecting separation of the cement on each pallet from the cement on adjacent pallets and where the compacting is being effected.

12. In a machine of the character set forth, the combination of means for advancing a series of pallets, means for discharging cement, or the like upon said pallets, means for compacting the cement on the pallets, upwardly cutting means for severing the cement into predetermined lengths where the compacting is being effected, and a device operating directly against the upper surface of the compacted mass of cement for leveling the upper surface thereof.

13. In a machine of the character set forth, the combination of means for advancing a series of pallets, means for discharging cement, or the like, upon said pallets, upwardly cutting means for severing the cement into predetermined lengths where the compacting is being effected, means for compacting the cement on the pallets, a device operating directly against the upper surface of the compacted mass of cement for leveling the upper surface thereof comprising a movable member positioned to engage the upper surface of the compacted mass, and means for actuating said member.

14. In a machine of the character set forth, the combination of means for advancing a series of pallets, means for discharging cement, or the like, upon said pallets, means for compacting the cement on the pallets, means for smoothing the upper surface of the compacted mass of cement, and means for thereafter applying a surfacing material to the upper surface of said mass.

15. In a machine of the character set forth, the combination of means for advancing a series of pallets, means for discharging a layer of cement, or the like, upon said pallets, means for compacting the layer of cement, means for applying a second layer of cement, or the like, to said first-applied layer, and means for compacting said second layer.

16. In a machine of the character set forth, the combination of means for advancing a series of pallets, means for discharging a layer of cement, or the like, upon said pallets, in ribbon form, means for compacting the layer of cement, means for applying a second layer of cement, or the like, in ribbon form, to said first-applied layer, and means for compacting said second layer.

17. In a machine of the character set forth, the combination of means for advancing a series of pallets, means for discharging a layer of cement, or the like, upon said pallets, means for compacting the layer of cement for receiving reinforcing means applied to the upper surface of said layer, means for roughening the top surface of said layer after the reinforcement is positioned thereon, means for applying a second layer of cement, or the like, to said first-applied layer, and means for compacting said second layer.

18. In a machine of the character set forth, the combination of means for advancing a series of pallets, means for discharging a layer of cement, or the like, upon said pallets, means for compacting the layer of cement for receiving reinforcing means applied to the upper surface of said layer, a brush device positioned to engage the upper surface of said layer, when actuated, and roughen the cement, means for applying a second layer of cement, or the like, to said first-applied layer, and means for compacting said second layer.

19. In a machine of the character set forth, the combination of a plurality of receptacles for cement, or the like, having discharge-outlets, means for advancing pallets in a plane beneath said discharge outlets, means for causing the cement to discharge from said receptacles upon said pallets in succession and in superposed layers, and means for separately compacting the different layers applied to said pallets.

20. In a machine of the character set forth, the combination of means for advancing a series of pallets, means for discharging a layer of cement, or the like, upon said pallets, means for compacting the layer of cement for receiving reinforcing means applied to the upper surface of said layer, means for pressing said reinforcing means into the upper surface of said layer, means for applying a second layer of cement, or the like, to said first-applied layer, and means for compacting said second layer.

21. In a machine of the character set forth, the combination of means for advancing a series of pallets, means for discharging a layer of cement, or the like, upon said pallets, means for compacting the layer of cement for receiving reinforcing means applied to the upper surface of said layer, means for pressing said reinforcing means into the upper surface of said layer, means for roughening the top surface of said layer after the reinforcement is positioned thereon, means for applying a second layer of cement, or the like, to said first-applied layer, and means for compacting said second layer.

22. In a machine of the character set forth, the combination of means for advancing pallets, means for applying cement, or the like, to said pallets, and a series of tamping devices constructed and arranged to operate in succession against the cement on the pallets and to successively different planes and tamp it to progressively greater densities.

23. In a machine of the character set forth, the combination of a movable support for a mass of cement, or the like, and a series of tamping devices arranged relatively closely together, and constructed and arranged to operate in succession against the cement on said support and to successively different planes and tamp it to progressively greater densities, the forward ones of said tampers operating to force portions of the cement rearwardly into the path of the tampers previously operating thereon.

24. In a machine of the character set forth, the combination of a movable support for a mass of cement, or the like, and a series of tamping devices arranged relatively closely together, said tamping devices extending transversely of said support, and the series thereof extending longitudinally of said support, said series of tamping devices being constructed and arranged to operate in succession against the cement on said support and to successively different planes and tamp it to progressively greater densities, the forward ones of said tampers operating to force portions of the cement rearwardly into the path of the tampers previously operating thereon.

25. In a machine of the character set forth, the combination of a movable support for a mass of cement, or the like, side walls at opposite sides of said support, and a series of tamping devices arranged relatively closely together and constructed and arranged to operate in succession against the cement on said support and to successively different planes and tamp it to progressively greater densities, the forward ones of said tampers operating to force portions of the cement rearwardly into the path of the tampers previously operating thereon.

26. In a machine of the character set forth, the combination of a support along which pallets are movable, a series of tamping devices arranged relatively closely together and constructed and arranged to operate in succession against cement applied to the upper surface of the pallets and to successively different planes and tamp it to progressively greater densities, a conveyer operating to move the pallets along said support and having division-plates arranged in spaced relation to each other, said division-plates forming the end walls of the molds, the bottoms of which are said pallets, and means coöperating with said conveyer for causing the latter to move vertically and raise said division-plates relatively to said pallets during lengthwise movement of said conveyer.

27. In a machine of the character set forth, the combination of means for supporting and advancing a series of pallets, with vertically movable division-plates adapted to extend upwardly between adjacent pallets, means for applying to the pallets at different points in their travel, layers of cement or the like, a tamping mechanism for tamping the first layer of cement before the second layer is applied thereto, a second tamping mechanism for tamping upon the first layer the second layer of cement, and means for vertically moving said division-plates to cause them to extend upwardly in the cement adjacent said first tamping mechanism to an elevation in which said plates will not interfere with the operation of said first named mechanism, and thereafter rise through the said second layer of cement to a position in which they will not interfere with the operation of said second tamping mechanism and thereafter downwardly withdrawing said plates from contact with the cement.

28. In a machine of the character set forth, the combination of means for supporting and advancing a series of pallets, with vertically movable division-plates adapted to extend upwardly between adjacent pallets, means for applying to the pallets at different points in their travel, layers of cement or the like, a tamping mechanism for tamping the first layer of cement before the second layer is applied thereto, a second tamping mechanism for tamping upon the first layer the second layer of cement, and means for vertically moving said division-plates to cause them to extend upwardly in the cement adjacent said first tamping mechanism to an elevation in which said plates will not interfere with the operation of said first named mechanism, and thereafter rise through said first layer to form guides for the application of reinforcing material to said first layer, and thereafter rise through the said second layer of cement to a position in which they will not interfere with the operation of said second tamping mechanism and thereafter downwardly withdrawing said plates from contact with the cement.

29. In a machine of the character set forth, the combination of a support along which pallets are movable, a movable element for moving the pallets along said support and having division plates arranged in spaced relation to each other, said division plates forming the end-walls of the molds, the bottoms of which are said pallets, means located at different points along said support for feeding cement or the like to said support to form a plural layer slab, means for compacting each layer separately, and means for causing said division plates to move upwardly relative to said pallets to sever said layers between adjacent pallets and extend above the first applied layer intermediate the said feeding means, thereby forming a guide for the application of reinforcement to said first layer.

30. In a machine of the character set forth, the combination of a support, means for discharging a layer of cement, or the like, upon said support, means for compacting the layer of cement for receiving reinforcing means applied to the upper surface of said layer, means for roughening the top surface of said layer after the reinforcement is positioned thereon, means for applying a second layer of cement, or the like, to said first-applied layer, and means for compacting said second layer.

31. In a machine of the character set forth, the combination of pallet-feeding means, means for applying cement, or the like, to said pallets to form a layer thereon, means for compacting the layer of cement on said pallets for receiving reinforcing means applied to the upper surface of said layer, means for roughening the top surface of said layer after the reinforcement is positioned thereon, means for applying a second layer of cement, or the like, to said first-applied layer, means for compacting said second layer, said pallet-feeding means being in the form of division plates which engage the ends of said pallets, and means coöperating with said division plates for moving the latter upwardly while in engagement with the pallets for effecting separation of the cement on each pallet from the cement on adjacent pallets.

32. In a machine of the character set forth, the combination of a movable support for a mass of cement, and means operating in the movement of said support to engage reinforcing material applied to the upper surface of said mass and force said material into said cement and cause it to be positioned a predetermined distance from said support.

LEROY BAUMGARTL.